United States Patent [19]

Gupta et al.

[11] Patent Number: 5,480,600
[45] Date of Patent: Jan. 2, 1996

[54] METHOD FOR MANUFACTURING THIN PROGRESSIVE ADDITION LENSES

[75] Inventors: Amitava Gupta, San Marino, Calif.; Ronald D. Blum, Roanoke, Va.

[73] Assignee: Innotech, Inc., Roanoke, Va.

[21] Appl. No.: 36,637

[22] Filed: Mar. 24, 1993

[51] Int. Cl.$^6$ ................................................ B29D 11/00
[52] U.S. Cl. ............................ 264/1.7; 264/2.2; 425/808
[58] Field of Search ............................ 264/1.4, 1.7, 2.2; 425/808

[56] References Cited

U.S. PATENT DOCUMENTS

| | | | |
|---|---|---|---|
| 4,190,621 | 2/1980 | Greshes | 264/2.2 |
| 4,522,768 | 6/1985 | Roscrow et al. | 264/2.2 |
| 4,615,847 | 10/1986 | Howden | 264/1.7 |
| 4,693,446 | 9/1987 | Orlosky | 264/2.2 |
| 5,147,585 | 9/1992 | Blum | 264/1.7 |

*Primary Examiner*—Mathieu D. Vargot
*Attorney, Agent, or Firm*—Kenyon & Kenyon

[57] ABSTRACT

A method is provided for casting a progressive addition lens from: a mold incorporating a spherical portion and an add zone; a preformed lens having a convex curvature correlated with the concave curvature of the mold; and a polymerizable resin. The method includes the steps of: placing a predetermined volume of resin into a cavity of the mold; placing the preformed lens into the mold such that a layer of resin spreads out and covers any intervening space between the lens and the mold; and displacing superiorly or nasally by a predetermined magnitude the optical center of the preformed lens with respect to the geometrical center of the mold.

13 Claims, 2 Drawing Sheets

METHOD FOR MANUFACTURING THIN PROGRESSIVE ADDITION LENSES

FIELD OF THE INVENTION

The present invention relates to a method for producing multifocal and progressive optical quality spectacle lenses from preformed lenses such that the optical characteristics of the finished lens can be varied from those of the preformed lens.

BACKGROUND OF THE INVENTION

Methods for producing plastic lenses of various prescriptions are well known. For example, Applicant's U.S. Pat. No. 4,873,029 discloses a method for making plastic lenses of ophthalmic quality for eye glasses. Additionally, U.S. Pat. No. 3,248,460 discloses a method for casting plastic lenses from thermosetting or thermoplastic materials. According to this method, a plastic blank having significantly less curvature than is required for the final intended prescription of the lens is used as a base onto which is cast an additional layer of material. The U.S. Pat. No. 3,248,460 employs a conventional optical gasket to provide a space or cavity between the plastic blank and the mold and to hold the resin material in the cavity. The additional layer of material alters the curvature of the resulting lens over the vast majority of its surface, hence changing the prescription of the resulting finished lens to the required power. Another method of making a plastic lens is disclosed in U.S. Pat. No. 3,946,982, in which a conventional optical gasket is used to cast an entire lens surface with a prescription layer.

Conventional industrial lens casting techniques require the use of "conventional optical gaskets" which hold together the components used to cast a semifinished lens which is subsequently ground and polished to the desired prescription. In most cases these conventional optical gaskets can only be used once before they must be reprocessed. Therefore, a significant number of different gaskets must be maintained in inventory.

A one-step process for casting finished multifocal lenses is even more demanding with regard to the required number of different conventional optical gaskets and the inventory of gaskets necessary to produce a variety of different finished lens multifocal prescriptions. In one such system, approximately 737 conventional optical gaskets must be maintained in inventory to allow the production of the full range of prescriptions. Moreover, these gaskets must be constantly replaced after only one use. In addition to the gaskets, approximately 200 "optical center movers" (OCMs) must also be inventoried to relocate or decenter the optical center. These OCMs are also not reusable and, hence must be constantly replaced.

Methods for fabricating multifocal lenses by casting a thin layer of resin onto a preformed lens are disclosed in U.S. Pat. Nos. 4,623,496 and 4,190,621. The '496 patent does not require the use of a gasket, while the '621 patent employs edge fixtures to maintain a predetermined separation between the preformed lens and the mold which is needed to form a resin layer of requisite thickness. Other known methods attempt to manufacture multifocal or progressive plastic lens using a lamination technique. Such a technique joins a preformed plastic section to another cured plastic prescription lens. A portion of the preformed section, which defines a multifocal or progressive region of the finished lens, is joined to the prescription lens with adhesive.

Another method of manufacturing a multifocal lens from a preformed lens is described in Applicant's U.S. Pat. No. 5,178,800, which describes a process of casting a resin layer over a preformed lens to form a multifocal lens without changing the lens correction at the optical center. U.S. Pat. No. 5,219,497 describes a photochemical casting process for manufacturing multifocal ophthalmic lenses from a preformed lens in which the lens correction either remains the same at the optical center or is changed in a predetermined manner, depending on the thickness of the resin layer applied.

In all cases, a key objective is to reduce the center and edge thickness of plastic progressive addition lenses, since the lenses are thereby rendered lighter, and cosmetically more attractive. Industrial lens casting processes seek to achieve reduced thickness by applying prism thinning techniques when semifinished lenses are ground and polished. For the most part, casting whole progressive addition lenses or casting a new progressive addition optic onto a preformed lens do not include the subsequent grinding of the lens optic, and hence cannot be thinned by prism thinning surfacing techniques. Therefore, there is a need for a method to directly cast a progressive addition optic onto a preformed lens which minimizes the center and edge thickness of the resultant progressive lens.

SUMMARY OF THE INVENTION

The present invention relates to a method for significantly reducing the thickness of progressive addition lenses that are fabricated by any known type of casting process which does not require the use of a gasket. This method is especially applicable to casting methods involving the use of preformed lenses, e.g., those methods disclosed in U.S. Pat. Nos. 4,623,496, 5,178,800, and 5,219,497. The invention provides a method for casting a multifocal or progressive region on a preformed plastic optical quality single vision spectacle lens to produce a resulting finished multifocal or progressive lens. The method has no effect on the lens correction at the optical center of the resultant finished progressive lens, which is controlled by the relative magnitudes of the curvatures of the two molds or the mold and the preformed lens. The preformed lens can be a finished lens having a curvature or correction on front and back surfaces or a semi-finished lens blank having a curvature or correction on only one surface.

A first embodiment of the invention concerns a method of casting a progressive addition lens from: a mold incorporating a spherical portion of concave curvature and an add zone; a preformed lens having a convex curvature correlated with a concave curvature of the mold; and a polymerizable resin. This embodiment comprises the steps of: placing the resin into a cavity of the mold; placing the preformed lens into the mold such that a layer of resin spreads out and covers any intervening space between the lens and the mold; displacing superiorly or nasally the optical center of the preformed lens with respect to the geometrical center of the mold; curing the resin layer; and demolding the finished progressive addition lens.

In this embodiment, the displacement of the preformed lens with respect to the mold is preferably greater than 1 mm and less than 7 mm superiorly, greater than 0.5 mm and less than 3 mm nasally, or both. The method can further comprise the step of locating the preformed lens in the displaced position within the concave surface of the mold by a collar, wherein the collar is preferably circumferential in shape, and is imprinted with a protractor or compass calibrated in degrees.

A second embodiment of the invention concerns a method of casting a finished progressive addition lens from: a mold incorporating a spherical portion, an add zone, and a peripheral internal bevel placed on a concave surface of the mold to form an inner edge facing in the superior direction toward the add power zone; a polymerizable resin; and a preformed lens whose convex curvature is correlated to the concave curvature of the mold. This embodiment comprises the steps of: placing the resin into the mold; placing the preformed lens on the resin, so that one edge of the preformed lens rests on the bevel forming the inner edge of the mold, whereby the resin forms an uninterrupted layer between the preformed lens and the mold, and fills any intervening space between the preformed lens and the mold; curing the resin layer; and demolding the finished progressive addition lens.

In this second embodiment, the internal peripheral bevel is preferably placed no less than 1 mm and no greater than 7 mm from the add power zone of the mold, and more preferably 5 mm from the add power zone of the mold.

DETAILED DESCRIPTION OF THE INVENTION

The method of the present invention for reducing the thickness of progressive addition or other types of transitionless multifocal lenses formed by casting a layer of resin over or under a preformed lens involves a predetermined displacement of one of the optical elements with respect to the other optical element. Conventional methods for lens casting onto a preformed lens as discussed above generally call for an alignment of the optical center of the preformed lens with the geometric center of the mold, while in the case of whole lens casting, the two molds are aligned with their geometric centers aligned with respect to one another. It has been found that by displacing the preformed lens or the upper mold with respect to the lower mold or the lower preformed lens, it is possible to reduce the center thickness of progressive addition lenses having a distance power +4.00 D by up to 2.0 mm (corresponding to a +4.00 D add), and the center thickness of lenses having a power of −2.00 D and lower by up to 1.5 mm with the same add power. This displacement of the upper mold or the preformed lens with respect to the other component may be brought about in several ways.

In one embodiment of the invention, a peripheral bevel is added to the lower optical element so that the ledge supports the upper mold or the preformed lens. A peripheral bevel may be grooved into the lower optical element at any distance from the periphery of the add zone, generally from 2 mm to 7 mm. The location of the peripheral bevel is either precisely at the center of the steepest portion of the optical element, adjacent to the add zone, or displaced laterally from the steepest part by a predetermined distance. The more inward the peripheral bevel, the greater is the relative displacement of the upper optical element. The magnitude of the thickness reduction of the resulting progressive addition lens is proportional to the magnitude of the displacement of the two optical elements with respect to each other.

Figure 1:
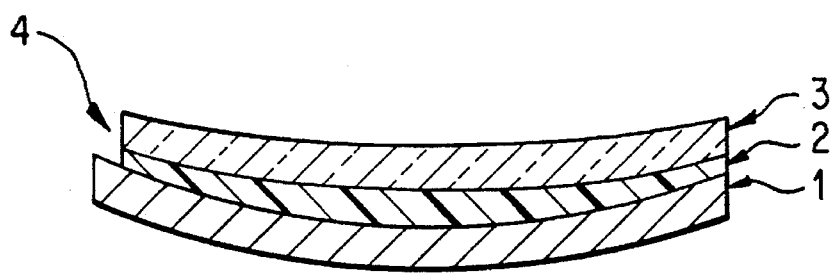
FIG. 1 shows a cut-away view of a mold assembly that includes a mold, a resin layer and a preformed lens displaced 3 mm superiorly with respect to the mold.

In a second embodiment of the invention, the upper optical element (the preformed lens or the upper mold) is simply displaced with respect to the lower optical element. The displaced upper element may be fixed in position by a collar or a fixture which may also allow rotational alignment of the upper optical element with respect to the lower optical element. This method thus provides a convenient method for aligning the astigmatic axis of the finished optic with respect to the add zone. Turning now to the figures, FIG. 1 shows a cut-away view of an assembly that includes an upper preformed lens 3, an intervening resin layer 2, and a lower mold 1, with the preformed lens 3 having a displacement 4 of 3 mm superiorly with respect to the geometric center of the mold 1. In one particular application of the invention the convex curvature of the preformed lens 3 is equal to the concave curvature of the mold 1, which are both spherical. In such a mold assembly where the curvatures are spherical (but may or may not be equal), the lens correction at the optical center of the preformed lens 3 is unchanged on displacement of the finished lens. In addition, the distance between the distance viewing zone and the reading zone on the surface of the finished optic is unchanged, while the location of both go down by 3 mm on the final optic. The effective cut out (or usable optical diameter) is reduced by 3 mm in the vertical meridian as a result of this displacement.

Figure 2:
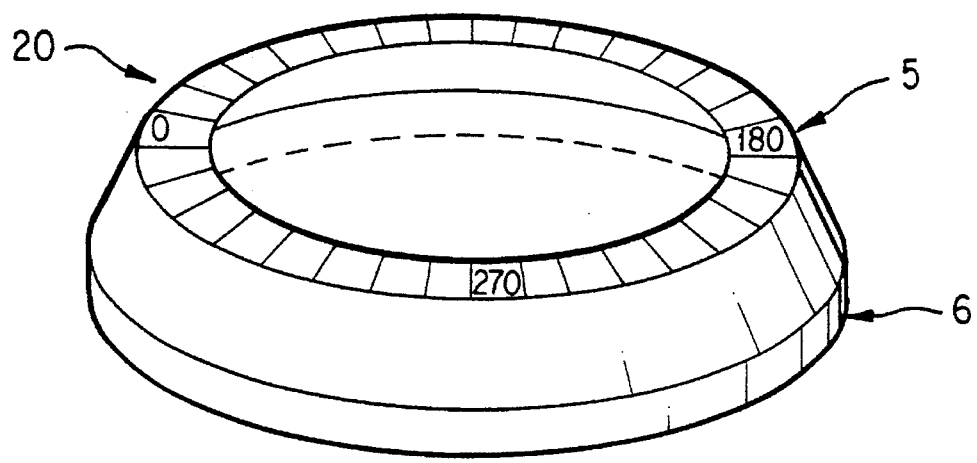
FIG. 2 shows a plan view of a collar used to hold a displaced preformed lens or mold in position, and to align the astigmatic axis of the final optic with respect to the add zone.

FIG. 2 shows a cut-away view of a collar 20 having a top surface 5 and a bottom surface 6 which may be used to locate the preformed lens to the appropriate position for the configuration shown in FIG. 1. The inner surface of the collar 20 slopes downward to engage the edge of the preformed lens, which may be as thin as 1.2 mm for a plus lens of spherical power +2.00 D or greater. The collar 20 is also provided with a protractor or a compass imprinted on its upper surface 5 to align the astigmatic axis of the preformed lens with respect to the add zone of the mold, located interiorly.

Figure 3:
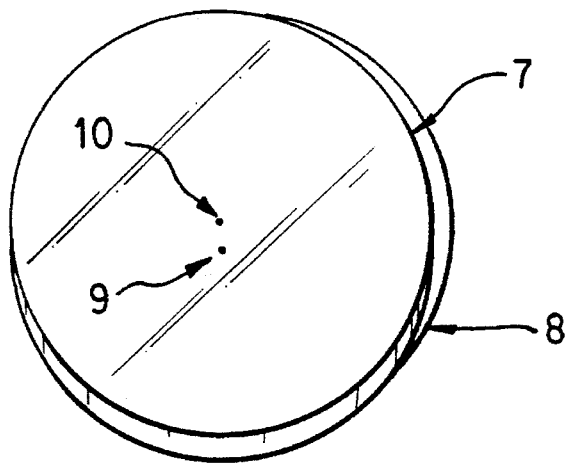
FIG. 3 shows a cut away view of the mold assembly seen in FIG. 1, except that the preformed lens is displaced superiorly 3 mm and nasally 1 mm with respect to the mold.

FIG. 3 shows a cut-away view of a mold assembly similar to that seen in FIG. 1, except that the optical center 10 of the upper optical element 7 (the preformed lens) is displaced 3 mm superiorly and 1 mm nasally with respect to the geometrical center 9 of the mold 8. The lateral displacement moves the add zone of the finished optic over the surface of the preformed lens optic 7 nasally by the same distance, hence increasing the cut out or the usable optical diameter in the nasal direction by 1 mm.

Figure 4A:
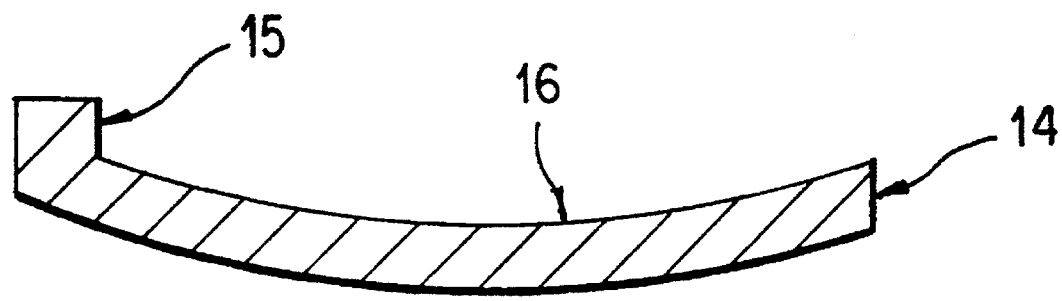
FIGS. 4A and 4B show a mold with a peripheral bevel located 5 mm from the steepest part of the optic.
Figure 4B:
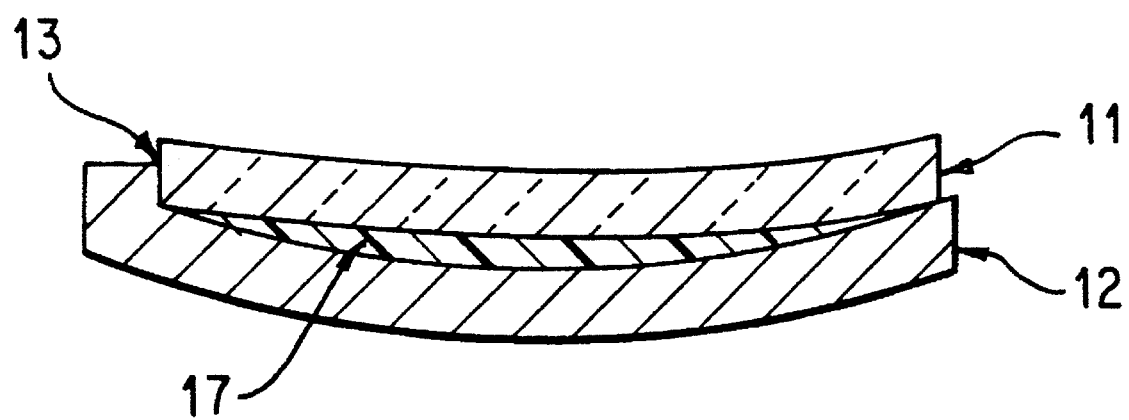

FIG. 4A shows a sectional view of a mold 14 having a bowl 16 and a peripheral bevel 15 located 5 mm from the edge which is located superiorly with respect to the steepest part of the optic. FIG. 4B shows a mold assembly that includes a mold 12 with a peripheral bevel 13, a preformed lens 11 and an intervening layer of resin 17 developed with this mold 12. These and other embodiments of the invention will be further illustrated with the following example.

EXAMPLE 1

Two mold assemblies were arranged as follows:

The first assembly comprised a mold incorporating a progressive addition optic that was made from tempered glass capable of transmitting UV radiation of wavelength 320 nm or longer, a layer of photopolymerizable resin, and a single vision preformed lens made from CR-39 plastic, also capable of transmitting UV radiation at a wavelength of 320 nm or longer. The concave curvature of the mold was 6.11 D (87 mm in radius), while the convex curvature of the lens was 6.25 D, or 84 mm in radius. The resin had a refractive index equivalent to the refractive index of the lens. The lens had a lens correction of +2.00 D, with an astigmatism power of −1.50 D. The add power provided by the mold was +2.50 D. The volume of resin added to the mold was 5.10 ml. The lens was placed centrosymmetrically with its optical center aligned to the geometrical center of the mold.

The second mold assembly was arranged as the first, except that the preformed lens was displaced by 3 mm superiorly and 1 mm nasally with respect to the mold. In this case, the volume of resin needed was reduced to only 3.35 ml, thus demonstrating that a resin layer having a reduced thickness was capable of achieving the optimum separation between the lens and the mold for the formation of the progressive addition optic. Accordingly, the resultant finished progressive lens is expected to be thinner than the finished lens from the first assembly. The resin spreads out to fill the intervening space between the model and the lens. The mold assemblies were placed in a mold tray and cured in a curing chamber. The lenses were demolded and their optics checked for distance sphere and cylinder, and add power. The center thickness of each lens was measured. It was determined that the center thickness of the progressive addition lens which was cast when the preformed lens did not undergo a displacement with respect to the mold was 5.1 mm, while the thickness of the lens cast with the displaced preformed lens was 3.8 mm.

What is claimed is:

1. A method of casting a progressive addition lens from a mold incorporating a spherical portion of concave curvature and an add zone, a preformed lens having a convex curvature correlated with the concave curvature of the mold, and a polymerizable resin, said method comprising the steps of:

placing the resin into a cavity of the mold;

placing the preformed lens into the mold such that a layer of resin spreads out and covers any intervening space between the lens and the mold;

displacing superiorly the optical center of the preformed lens with respect to the geometrical center of the mold to decrease the thickness of said progressive addition lens;

curing the resin layer; and demolding the finished progressive addition lens.

2. A method of casting a finished progressive addition lens from a mold incorporating a spherical portion, an add zone, and a peripheral internal bevel placed on a concave surface of the mold to form an inner edge facing in the superior direction toward the add power zone, a polymerizable resin, and a preformed lens whose convex curvature is correlated to the concave curvature of the mold, said method comprising the steps of:

placing the resin into the mold;

placing the preformed lens on the resin, so that one edge of the preformed lens rests on said bevel forming the inner edge of the mold, whereby said resin forms an uninterrupted layer between the preformed lens and the mold, and fills any intervening space between the preformed lens and the mold;

curing the resin layer; and demolding the finished progressive addition lens.

3. The method of claim 1 wherein the displacement of the preformed lens with respect to the mold is greater than 1 mm and less than 7 mm superiorly.

4. The method according to claim 3 wherein the preformed lens is also displaced with respect to the mold by an amount greater than 0.5 mm and less than 3 mm nasally.

5. The method according to claim 1 further comprising the step of locating the preformed lens in the displaced position within the concave surface of the mold by a collar.

6. The method of claim 5 wherein said collar is circumferential in shape, and is imprinted with a protractor or compass calibrated in degrees.

7. The method of claim 2 wherein the internal peripheral bevel is placed no less than 1 mm and no greater than 7 mm from the add power zone of the mold.

8. A method of casting a progressive addition lens comprising the steps of:

arranging a mold having a spherical portion of concave curvature, an add zone, and a peripheral internal bevel placed on the concave surface of the mold to form an inner edge facing in the superior direction toward the add zone; a polymerizable resin; and a preformed lens having a convex curvature correlated to the concave curvature of the mold, such that said preformed lens is positioned in said mold against said peripheral internal bevel and said resin fills intervening space between the preformed lens and the mold; and curing the resin.

9. The method of claim 8 wherein the internal peripheral bevel is placed no less than 1 mm and no greater than 7 mm from the add power zone of the mold.

10. A method of casting a progressive addition lens comprising the steps of:

arranging a mold having an add power zone, a spherical portion of concave curvature and a geometric center; a preformed lens having an optical center and a convex curvature correlated with the concave curvature of the mold; and a polymerizable resin; such that said layer of polymerizable resin fills an intervening space between the preformed lens and the mold and such that the optical center of the preformed lens is displaced superiorly with respect to the geometric center of the mold to decrease the thickness of said progressive addition lens; and curing said polymerizable resin.

11. The method of claim 10 wherein the displacement of the preformed lens with respect to the mold is greater than 1 mm and less than 7 mm superiorly.

12. The method according to claim 10 wherein the preformed lens is also displaced nasally with respect to the mold.

13. The method according to claim 11 wherein the preformed lens is also displaced nasally with respect to the mold by an amount greater than 0.5 mm and less than 3 mm.

* * * * *